US006931400B1

(12) United States Patent
Indyk et al.

(10) Patent No.: US 6,931,400 B1
(45) Date of Patent: Aug. 16, 2005

(54) METHOD AND SYSTEM FOR IDENTIFYING REPRESENTATIVE TRENDS USING SKETCHES

(75) Inventors: Piotr Indyk, Cambridge, MA (US); Nikolaos Koudas, Springfield, NJ (US); Shanmugavelayutham Muthukrishnan, Washington, DC (US)

(73) Assignee: AT&T Corp., New York, NY (US)

( * ) Notice: Subject to any disclaimer, the term of this patent is extended or adjusted under 35 U.S.C. 154(b) by 500 days.

(21) Appl. No.: 10/083,812

(22) Filed: Feb. 27, 2002

Related U.S. Application Data

(60) Provisional application No. 60/313,473, filed on Aug. 21, 2001.

(51) Int. Cl.$^7$ .............................................. G06F 17/30
(52) U.S. Cl. ........................................................ 707/6
(58) Field of Search ............................... 707/100, 101, 707/102, 104.1, 3, 4, 6; 700/21; 701/208; 704/231, 256; 712/4; 345/419; 715/532; 382/181–189, 382/209, 217, 219, 224–228

(56) References Cited

U.S. PATENT DOCUMENTS

| 5,904,727 | A | * | 5/1999 | Prabhakaran ............... 701/208 |
| 5,933,806 | A | * | 8/1999 | Beyerlein et al. ........... 704/256 |
| 6,023,673 | A | * | 2/2000 | Bakis et al. ................. 704/231 |
| 6,567,709 | B1 | * | 5/2003 | Malm et al. .................... 700/21 |
| 6,665,790 | B1 | * | 12/2003 | Glossner et al. ................ 712/4 |

OTHER PUBLICATIONS

R. Agrawal, et al., "Efficient Similarity Search in Sequence Databases." Proc. Of the 4$^{th}$ Int. Conference on Foundations of Data Organization and Algorithms, pp. 69-84, Oct. 1993.
D. Barbara, et al., "The New Jersey Data Reduction Report." Data Engineering Bulletin, Dec. 1997.

T. H. Cormen, et al., "Introduction to Algorithms." McGraw Hill and MIT Press, pp. 780-781, 1990.
C. Faloutsos and D. Lin, "Fast Map: A Fast Algorithm for Indexing, Data Mining and Visualization of Traditional and Multimedia Data Sets." Proceedings of ACM SIGMOND, San Jose, California, pp. 163-174, Jun. 1995.
C. Faloutose, et al., "Fast Subsequence Matching in Time Series Databases." Proceedings of ACM SIGMOND, pp. 419-429, May 1994.
A. Glonis, et al., "Similarity Search in High Dimensions via Hashing." Proceedings of VLDB, pp. 518-529, Sep. 1999.
J. Han et al, "Efficient Mining of Partial Periodic Patterns in Time Series Databases." Proceedings of ICDE, pp. 106-115, Mar. 1999.
J. Hellerstein, "Automated Tuning Systems: Beyond Decision Support." Computer Measurement Group, pp. 263-270, Dec. 1997.
J. Han, et al., "Mining Segment-Wise Periodic Patterns in Time Series Databases." KDD, pp. 214-218, Aug. 1998.
J. Hellerstein, et al., "An Approach to Predictive Detection for Service Management." Symposium on Integrated Network Management, pp. 309-322, May 1999.

(Continued)

Primary Examiner—Safet Metjahic
Assistant Examiner—Etienne LeRoux (57) ABSTRACT

A method and system for identifying representative data trends using sketches. A sketch is a lower dimensional vector used to represent higher dimensional data. The properties of sketches include data dimensionality reduction, sketches synthesized from other sketches, and the distance between sketches comparable to the distance between the data the sketches represent. Exemplary embodiments include identifying relaxed periods and average trends.

40 Claims, 6 Drawing Sheets

OTHER PUBLICATIONS

J. Hellerstein, et al., "Characterizing Normal Operation of a Web Server: Application to Workload Forecasting and Capacity Planning." Computer Measurement Group, pp. 150-160, Dec. 1998.

W.B. Johnson and J. Lindenstrauss, "Extensions of Lipshitz Mapping into Hilbert Space." Contemporary Mathematics, vol. 26, pp. 189-206, May 1984.

K. V. Ravi Kanth, et al., "Dimentionality Reduction for Similarity in Dynamic Databases." Proceedings of ACM SIGMOD, pp. 166-176, Jun. 1998.

J. Lee, et al., "Multi-dimensional Selectivity Estimation Using Compressed Histogram Information." Proceedings of the 1999 ACM SIGMOD Int. Conf. On Management of Data, pp. 205-214, Jun. 1999.

Y. Matias, et al., "Wavelet-Based Histograms for Selectivity Estimation." Proceedings of the 1998 ACM SIGMOD Int. Conf. On Management of Data, pp. 448-459, Jun. 1998.

A. Oppenheim and A. Willsky, "Signals and Systems." Prentice Hall, Signal Processing Series, pp. 359-373, 1$^{st}$ Ed., 1983; 2$^{nd}$ Ed. 1997.

V. Poosala and Y. Ioannidis, "Selectivity Estimation Without the Attribute Value Independence Assumption." Proceedings of VLDB, Athens, Greece, pp. 486-495, Aug. 1997.

D. Sankoff and J. Kruskal, "Time Warps, String Edits and Macromolecules: The Theory and Practice of Sequence Comparison." Addison-Wesley, Reading, Massachusetts, pp. 1-39 (1983).

J. Vitter and M. Wang, "Approximate Computation of Multidimensional Aggregates on Sparse Data Using Wavelets." Proceedings of SIGMOD, pp. 193-204, Jun. 1999.

J.S. Vitter et al., "Data Cube Approximation and Histograms via Wavelets," Proceedings of the 1998 ACM CIKM Int. Conf. On Information and Knowledge Management, pp. 96-104, Nov. 1998.

R. Durbin, et al., "Biological Sequence Analysis: Probabilistic Models of Proteins and Nucleic Acids." Cambridge University Press, pp. 1-10, 1998.

P. Indyk and R. Motwani, "Approximate Nearest Neighbors: Towards Removing the Curse of Dimensionality." 30$^{th}$ Symposium on the Theory of Computing, pp. 604-613, Sep. 1998.

* cited by examiner

FIG. 7(a)
SEQUENCE 1

FIG. 7(b)
TREND 1

FIG. 7(c)
SEQUENCE 2

FIG. 7(d)
TREND 2

FIG. 8

METHOD AND SYSTEM FOR IDENTIFYING REPRESENTATIVE TRENDS USING SKETCHES

REFERENCE TO RELATED DOCUMENTS

This application claims benefit of priority under 35 U.S.C. §119(e) to U.S. provisional application Ser. No. 60/313,473, filed Aug. 21, 2001, the entire contents of which are incorporated herein by reference.

TECHNICAL FIELD

The present invention relates generally to data management and, more particularly, to methods, systems, and machine-readable media for identifying representative trends in large sets of data.

BACKGROUND OF THE INVENTION

Time series databases, containing data captured over time, are commonly used in such areas as finance, meteorology, telecommunications, and manufacturing to keep track of data valuable to that particular area. For example, financial databases may track stock prices over time. Meteorological parameters such as the temperature over time are stored in scientific databases. Telecommunications and network databases include data derived from the usage of various networking resources over time such as the total number and duration of calls, number of bytes or electronic mails sent out from one ISP to another, amount of web traffic at a site, etc.; manufacturing databases include time series data such as the sale of a specific commodity over time.

Time series data depict trends in the captured data, which users may wish to analyze and understand. Users may wish to know, for a given time window, a trend of "typical" values or an "outlier" trend. Conversely, users may wish to find the time window in which most trends are as similar as possible or clustered. These similar trends are called "representative trends." Representative trends may be used in lieu of the entire database for quick approximate reasoning. In addition, they can be used for prediction and for identifying and detecting anomalous behavior or intrusion.

By their very nature, time series databases tend to contain large amounts of data. As such, using representative trends of the data reduces the amount of data to be analyzed. However, the large amounts of data must first be processed in order to identify the representative trends.

There is a need in the art to identify representative trends efficiently and quickly in large amounts of data.

SUMMARY OF THE INVENTION

The present invention provides a method, system, and machine-readable medium for identifying representative trends in large amounts of data using sketches. A "sketch" is a lower dimensional vector used to represent higher dimensional data. The present invention includes reducing subvectors of the data to sketches, summing the distances between each sketch and every other sketch, and selecting the data subvector corresponding to the sketch with the lowest summed distance as the representative trend of the data.

DETAILED DESCRIPTION

Embodiments of the present invention provide a method for identifying representative trends in data using sketches. A sketch is a lower dimensional vector used to represent higher dimensional data. When there are large amounts of data, the data may first be partitioned into data subvectors of a given dimension. These data subvectors can then be transformed into sketches, which have lower dimensions. The lower dimensions correspond to less data being processed. As such, using sketches of the data, rather than the data itself, provides more efficient, faster performance. So the user may be able to quickly analyze the data without utilizing large amounts of processor time and system memory.

In addition to dimensionality reduction, sketches exhibit distance and synthesis properties that may be used in data analysis. The synthesis property provides a sketch synthesized from existing sketches. This property is particularly useful when existing sketches represent subvectors with a given dimension, but sketches are needed for subvectors with a higher dimension. In such a case, the sketch may be easily synthesized from the existing sketches, rather than calculated from scratch. This synthesis property allows the user to generate sketches once and then use those sketches to represent multiple subvector dimensions without having to reprocess the data in its entirety, thereby saving processor time and system memory.

According to the distance property, the distance between two sketches is comparable to the distance between the subvectors that the sketches represent. Thus, by calculating the distance between two sketches, the distance between the subvectors that the sketches represent may be found with measurable accuracy. In addition, by increasing the sketch dimension, the probability of identifying the data's representative trend may be increased and the error between the data and the sketches reduced. This property allows the user to calculate distances with less data—i.e. the sketches rather than the data itself—thereby saving processor time and system memory. The distance property holds for synthesized sketches as well.

Figure 1:
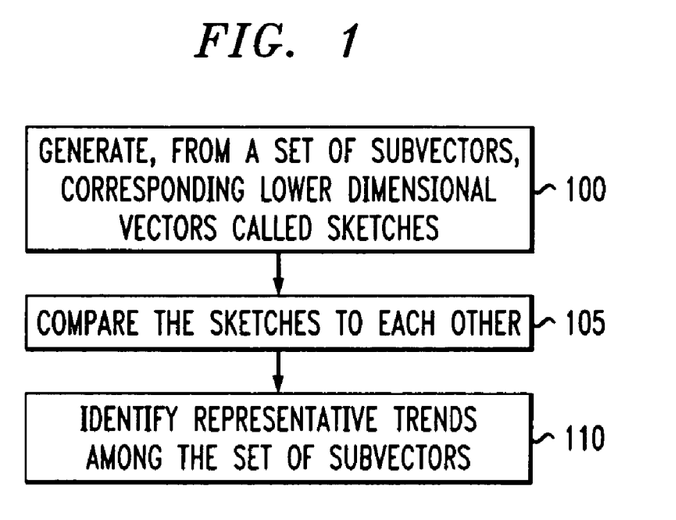
FIG. 1 is a flowchart of an embodiment of a method according to the present invention.

FIG. 1 is a flowchart of an embodiment of a method for identifying representative trends according to the present invention. First, sketches may be generated for data partitioned into subvectors (step 100). The data may be partitioned in a number of ways to generate the data subvectors of a given dimension T. Each adjacent subvector may include anywhere from 0 to T−1 overlapping data elements. The final subvectors may have dimensions less than T and may generally be ignored in data analysis. The amount of overlap may affect how well synthesized sketches match their data subvectors and how quickly representative trends are identified. The sketch dimensions may be lower than the subvector dimensions. Each of the generated sketches may then be compared to every other generated sketch for a given subvector dimension T to determine how closely the sketches match each other (step 105). The sketch that has the most matches may be considered to be representative of the data. The representative trend may then be identified as the subvector corresponding to the most closely matching sketch and the period of the data may be identified as the subvector dimension T (step 110). As a result, the representative trend of the data may be found by processing less data—i.e., the sketches rather than the entire data—thereby saving processing time and system memory. Optionally, this method may be repeated for multiple subvector dimensions. The result may then be output to a graphical display, storage device, transmitter, or the like.

Additionally, the present invention offers the following advantages: (a) the best trend may be identified, as opposed to a sinusoidal approximation of it; (b) the trends may be identified using various metrics, as opposed to only a distance metric as is the case for Fourier transforms; (c) for noisy data, filtering may be omitted, unlike the Fourier transform; and (d) representative trends may be identified from subvectors, unlike Fourier transforms which treat the entire data.

Figure 2:
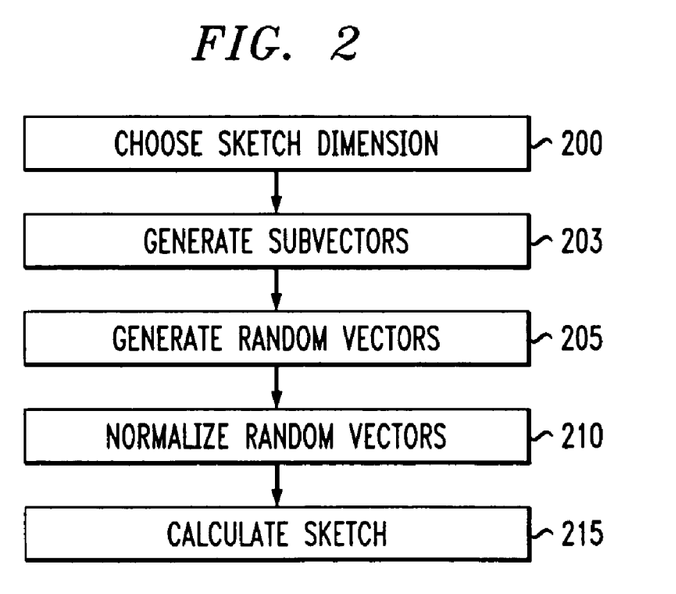
FIG. 2 is a flowchart of an exemplary method for generating sketches.

FIG. 2 is a flowchart of an exemplary method for generating the sketches. First, the sketch dimension is chosen (step 200). By choosing the sketch dimension, the user may determine how much error to allow in the final result, i.e. between the identified and the actual representative trend of the data. The higher the dimension, the smaller the error. Next, the data subvectors may be generated by partitioning the data (step 203). A random vector with the same dimension as the data subvectors may then be generated to have a normalized, Gaussian distribution (steps 205, 210). The elements of the random vector may be samples from a Gaussian distribution with zero mean and unit variance, normalized to have unit length. The sketch for each data subvector may be calculated using the subvector and the random vector (step 215).

The sketch may be calculated using a dot product between the subvector and the random vector. A dot product is a well-known mathematical tool for transforming one vector into another. In the present invention, the subvector may be projected onto the random vector to produce the sketch vector. The advantage is that such a projection reduces the dimension of the data to be analyzed, thereby saving processor time and system memory.

For example, suppose $\vec{t}_1=(2, 1, 3, 1)$ and it is desired to construct a sketch vector of dimension 2. Two vectors $\vec{v}_1=(-0.45, -0.09, 0.10, 0.87)$ and $\vec{v}_2=(-0.19, 0.73, -0.61, 0.21)$ may be chosen as normalized Gaussian distributed vectors. The dot product may be calculated between $\vec{t}_1$ and $\vec{v}_1$ to produce the first element of the sketch and between $\vec{t}_1$ and $\vec{v}_2$ to produce the second element of the sketch. Hence, the sketch of $\vec{t}_1$, $S(t_1)$ is (0.18, −1.27).

Optionally, the sketch may be calculated using a polynomial convolution between the subvector and the random vector. A polynomial convolution is a well-known mathematical tool. In the present invention, the subvector may be convolved with the random vector to produce the sketch. The advantages of the convolution are that it reduces the dimension of the data to be analyzed and all the elements of the sketch vector may be calculated together, thereby saving processor time and system memory.

Figure 3:
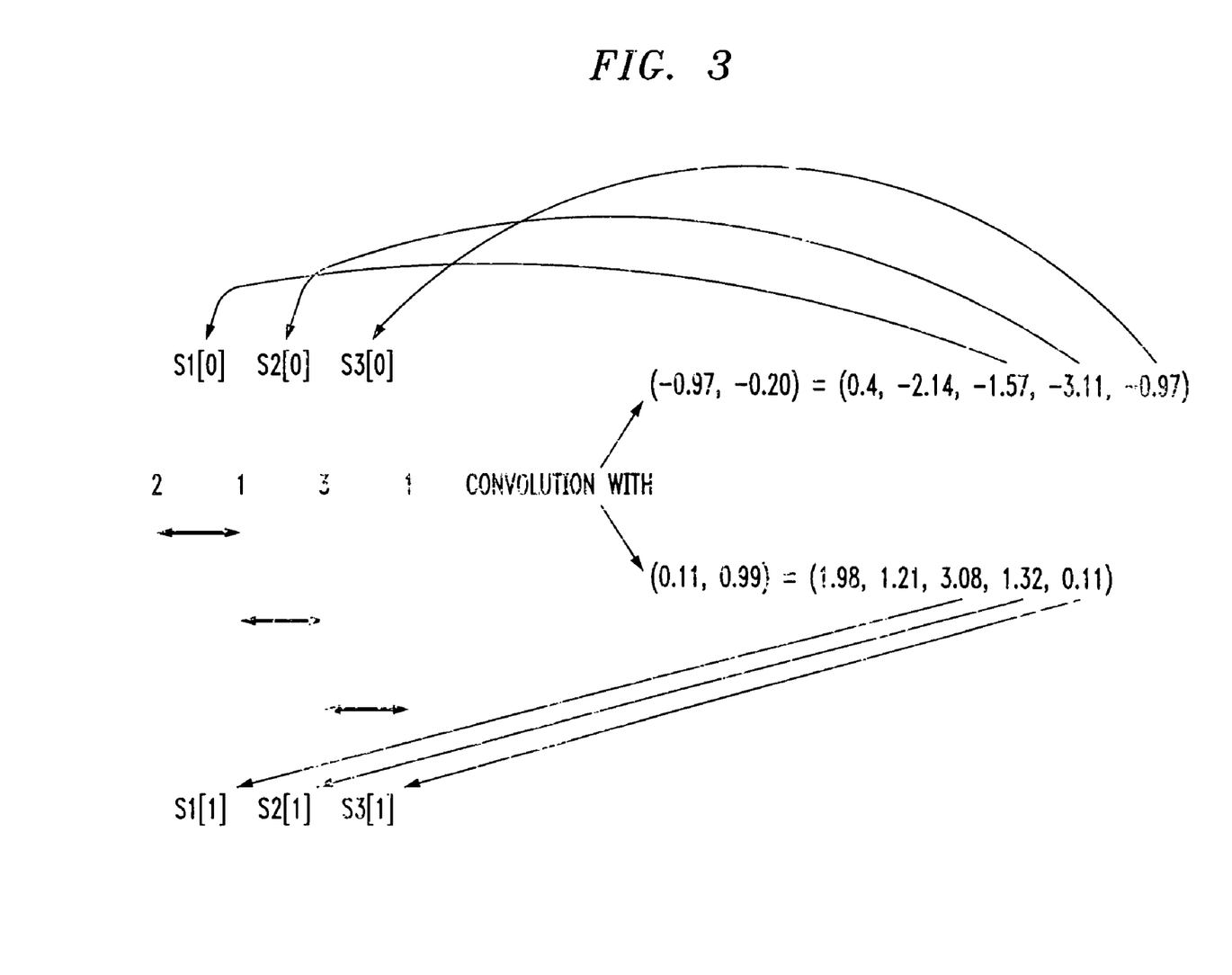
FIGS. 3 and 4 illustrate the method of FIG. 2.

FIG. 3 shows an example using polynomial convolution to compute sketches. A vector $\vec{t}=(2, 1, 3, 1)$ may be partitioned into subvectors of dimension 2, $t_1=(2, 1)$, $t_2=(1, 3)$ and $t_3=(3, 1)$. The subvectors may then be convolved with normalized vectors $\vec{v}_1=(-0.97, -0.20)$ and $\vec{v}_2=(0.11, 0.99)$. The first and second elements of each sketch of dimension 2 may be computed at the same time, such that S1=(−2.14, 1.21), S2=(−1.57, 3.08), and S3=(−3.1, 1.32).

Optionally, the sketch may be calculated by synthesizing it from a pool of sketches. Recall the synthesis property that allows a sketch to be synthesized from existing sketches. A pool of sketches is a small subset of the set of all sketches that could be calculated for a given set of subvectors. To generate the sketch pool, first, two sets of normalized random vectors may be generated (steps 205, 210 of FIG. 2). Then, two sets of sketches may be calculated by either a dot product or a polynomial convolution using the data subvectors and each set of the random vectors. The synthesized sketch may then be calculated by adding corresponding sketches from each set. Typically, one sketch may be selected from each set. The selected sketch represents all or portions of the data to be represented by the synthesized sketch. If the dimension of the subvector of interest is a power of the subvector dimension represented in the sketch pool, then a sketch in the pool representing the same subvectors or subvector portions may be used to represent the subvector of interest. If, however, the dimension is not a power of the subvectors represented in the pool, the sketch may be synthesized as described above.

This pool of sketches may be calculated and stored prior to data analysis. As such, the pool of sketches may be used as a look-up table during analysis. Thus, the synthesized sketch may be calculated very quickly from existing sketches. This synthesis allows sketches to represent subvectors of various dimensions without recalculating random vectors and repartitioning subvectors, thereby saving processor time and system memory.

Figure 4:
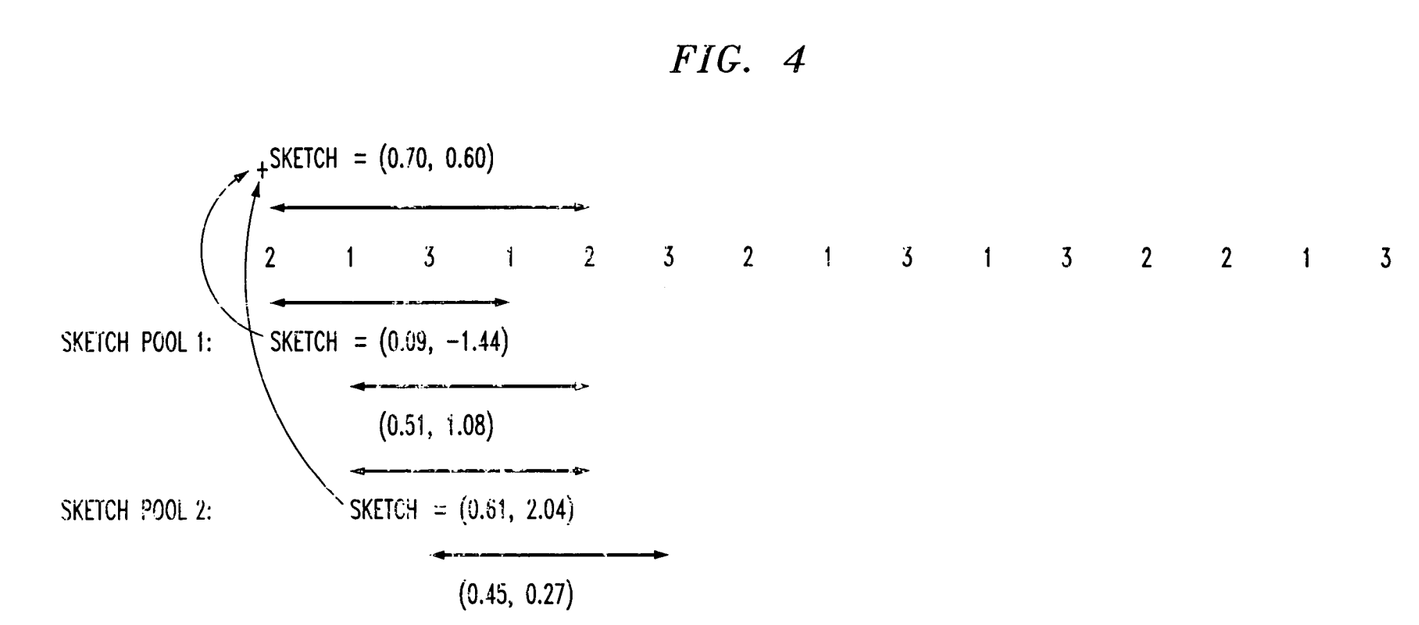

FIG. 4 shows an example using a sketch pool to compute a sketch. In this example, the sketch representing a subvector of dimension 5 may be computed from a pool of sketches representing subvectors of dimension 4. The subvector of dimension 5 is $\vec{t}=[2\ 1\ 3\ 1\ 2]$. The first set of pool sketches includes $S^1(t_1)=(0.09, -1.44)$ for $t_1=[2\ 1\ 3\ 1]$ and $S^1(t_2)=(0.51, 1.08)$ for $t_2=[1\ 3\ 1\ 2]$. The second set of pool sketches includes $S^2(t_2)=(0.61, 2.04)$ for $t_2$ and $S^2(t_3)=(0.45, 0.27)$ for $t_3=[3\ 1\ 2\ 3]$. The sketch pool represents subvectors having dimensions that are a power of 2. According to the present invention, since the dimension 5 is not a power of 2, the sketch for $\vec{t}$ is $S'(t)= S^1(t_1)+S^2(t_2)=(0.70, 0.60)$. Note that the second, third, and fourth elements of $t_1$ and $t_2$ overlap. The more overlap between the added subvectors, the more accurate the synthesized sketch—i.e., the more closely the synthesized sketch matches an actual sketch calculated from scratch. As few as one element may overlap and the accuracy may be high enough for data analysis purposes.

Figure 5:
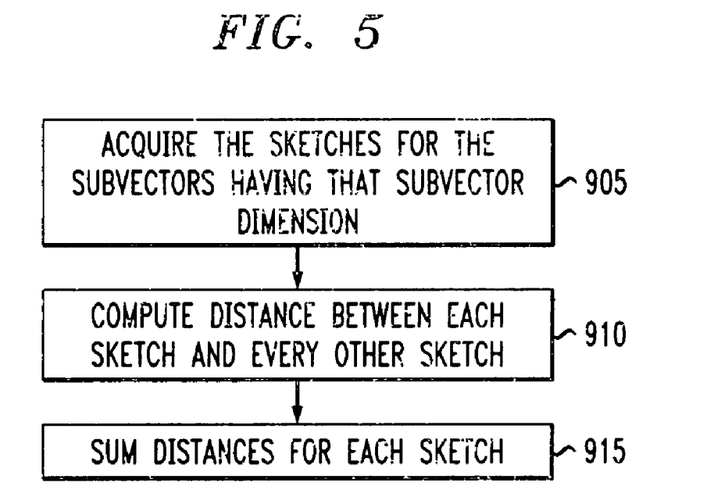
FIG. 5 is a flowchart of an exemplary method for comparing sketches.

FIG. 5 shows an exemplary method for comparing the sketches. First, sketches of subvectors of dimension T may be acquired (step 905). Then, the distance between the sketch of each subvector and the sketches of each of the other subvectors may be calculated (step 910). Exemplary distance measurements include the $L_2$, $L_1$, and $L_\infty$ norms, which are well-known in the art. For each sketch, the inter-sketch distance may be calculated as the sum of the calculated distances (step 915). As such, a lowest of the summed distances may be found. This lowest distance indicates how closely sketches match each other and data similarities, i.e., representative trends. According to the distance property, this inter-sketch distance may be substituted for the distance between the data subvectors to compare the subvectors and identify their trends. Advantageously, less data may be processed, thereby saving processor time and system memory.

Optionally, the sketch comparison may be repeated for multiple subvector dimensions T. In this case, the sketches may be recalculated or synthesized for the different dimensions and the distances between them calculated. So, the lowest summed distance would be the lowest distance among all the sketches at all the different subvector dimensions. The advantage of employing this option is that the absolute lowest distance may be selected, indicating the best match and representative trend. This option may be used if the lowest distance exceeds a predetermined threshold, indicating that no good representative trend has been identified at the current subvector dimensions. In this instance, the data may be partitioned into subvectors of a higher dimension, T+1 for example, and the sketches generated using the pool of sketches or, optionally, from scratch.

Optionally, for each subvector dimensions T, the distance between the sketch of the first subvector and the sketches of each of the other subvectors may be calculated (step 910). For the first sketch at each T, the inter-sketch distance may be calculated as the sum of the calculated distances (step 915). This inter-sketch distance indicates how closely the first sketch matches other sketches. The lowest of the summed distances among the different dimensions may be found. This lowest distance indicates which data subvector dimension T best matches the period of the data.

Figure 6:
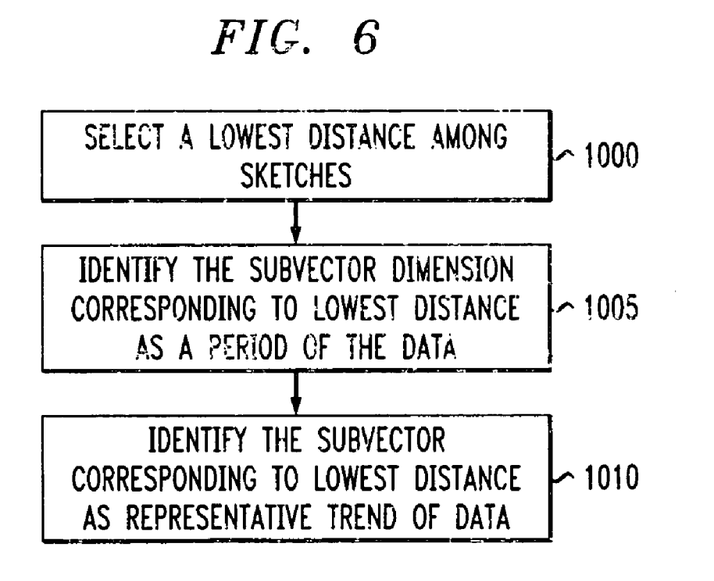
FIG. 6 is a flowchart of an exemplary method for identifying representative trends in data.

After the inter-sketch distances are calculated, the representative trend may be identified and output as shown in FIG. 6. The lowest inter-sketch distance may be selected (step 1000). From FIG. 5, the selected distance may be the lowest distance between the first and the other subvectors among the various subvector dimensions T or the lowest distance between any one and all other subvectors among the various subvector dimensions T. The subvector dimension T that corresponds to the lowest distance may be identified as the period of the data (step 1005). As such, the subvector corresponding to the lowest distance may be identified as the representative trend of the data (step 1010). The representative trend of data may be output to a graphical display, storage device, transmitter, or the like.

The present invention may be applied to data to find relaxed periods and average trends. It is to be understood that the relaxed period and average trend applications are for exemplary purposes only, as the present invention may be used to find a variety of data patterns or trends.

Figure 7A:
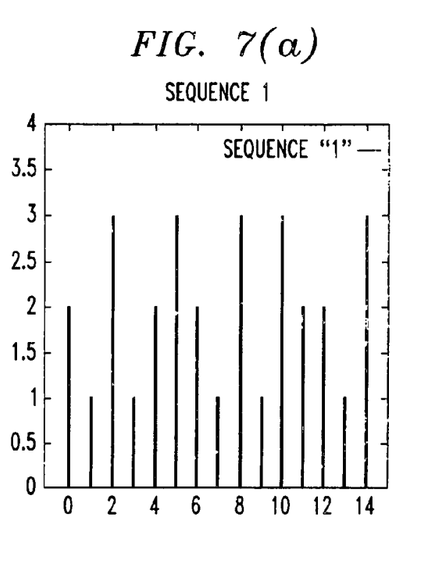
FIGS. 7(a)–(d) illustrate representative relaxed periods and average trends.
Figure 7B:
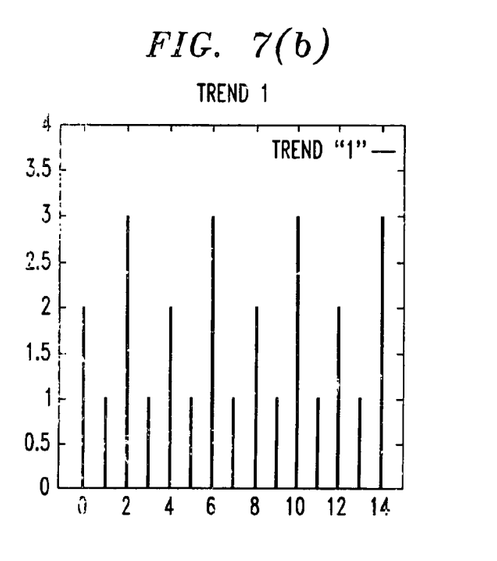

A relaxed period of data t is defined as the period T of data t' generated by repeating a subvector of dimension T that most closely matches t—that is, the period T of the data t' that has the lowest distance from t. The relaxed period's representative trend is the subvector of dimension T. For example, the relaxed period's representative trend of 213123213132213 is 2132 and the relaxed period is 4. FIG. 7(*a*) shows an exemplary data vector of dimension 15. Its corresponding trend is shown in FIG. 7(*b*). It includes 4 repetitions of the first four values of the vector in FIG. 7(*a*). The vector in FIG. 7(*b*) "resembles" the original vector to a great extent. Hence the first four values of the vector in FIG. 7(*b*) may be thought of as being representative of the entire vector of FIG. 7(*a*).

Figure 7C:
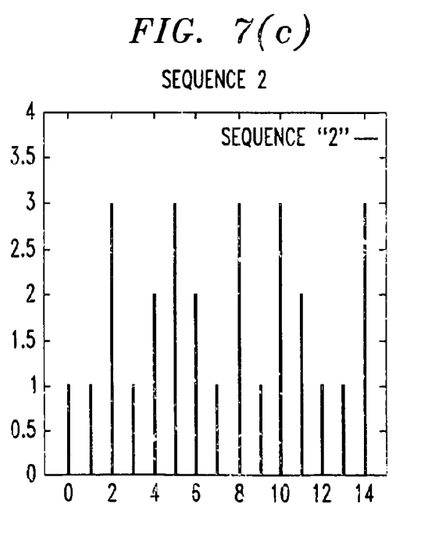
Figure 7D:
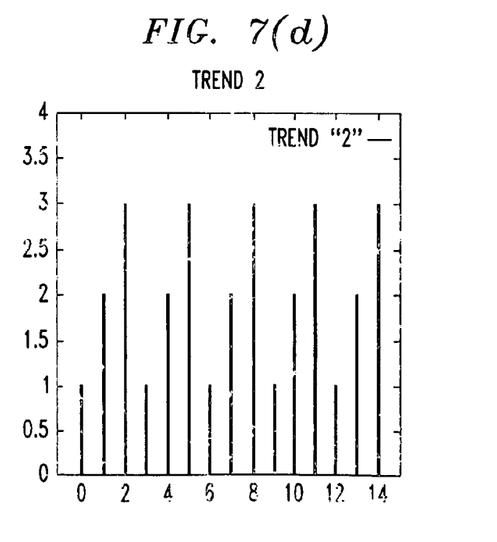

An average trend is the subvector of data whose total distance to all the other subvectors is the smallest. The corresponding period is the subvector dimension T. For example, if t=113123213132113 as in FIG. 7(*c*) and T=3, then some subvectors of interest may be 113, 123, 213, 132, and 113, or a consecutive group of three elements. The average trend is 123 which has a lowest total distance of the other subvectors. The average trend is shown in FIG. 7(*d*). FIG. 7(*d*) presents a vector derived by 5 repetitions of 123 in FIG. 7(*c*). The vector in FIG. 7(*d*) is quite similar to that in FIG. 7(*c*), and hence may be thought of as representative. The representative trend may be output to a graphical display, storage device, transmitter, or the like.

If the distance between the sketches is zero, then the dimension of the subvectors that the sketches represent is the exact period of the data. Other variants of representative trends may be of interest as well.

Applying the method of the present invention to identify a relaxed period proceeds as follows: Data may be partitioned into subvectors of dimension T. A sketch dimension may be chosen. Then, the subvectors may be reduced to the sketches using an exemplary method, such as a dot product, polynomial convolution, or a sketch pool. If the sketch pool is used, the sketch pool would have been generated and stored prior to this process. After the sketches are generated, the distances between the first sketch and the other sketches may be calculated and summed. This may be repeated for several different subvector dimensions. Then, the lowest distance among the different dimensions may be selected. The relaxed period may be identified as the subvector dimension T corresponding to the lowest distance.

Similarly, to identify an average trend, data may be partitioned into subvectors of dimension T. A sketch dimension may be chosen. Then, the subvectors may be reduced to the sketches using an exemplary method, such as a dot product, polynomial convolution, or a sketch pool. If the sketch pool is used, the sketch pool would have been generated and stored prior to this process. After the sketches are generated, each of their distances to the other sketches may be calculated and summed for each sketch. The lowest distance may be selected. If the lowest distance exceeds a predetermined threshold, the process may be repeated for a different subvector dimension. Or the process may be repeated just to find the absolute lowest distance among several different subvector dimensions. After the lowest distance is selected, the average trend may be identified as the subvector corresponding to the lowest distance.

The methods of FIGS. 2, 5, and 6 may be used in combination or alternatively according to the present invention.

The present invention may be implemented for any application in which large amounts of data are used. Exemplary applications include stock market tracking and weather tracking. In such applications, a data set may be generated by sampling the measured data. For example, the price of a particular stock may be sampled every day or atmospheric pressure and temperature measurements may be sampled every hour. Conversely, the data set may be acquired from a source already in sampled form. Representative trends of the data set may then be identified. The identified trends may be output to an appropriate device for graphical display, storage, transmission, or further analysis. Exemplary analysis includes comparing the trends to prior trends to establish patterns of behavior or anomalies.

Some aspects of the present invention may be implemented using the following equations:

To synthesize a sketch, suppose there are two sketches $S^1$ and $S^2$ representing two data subvectors of dimension X, where X<T. The user wishes to produce a third sketch S' that represents a data subvector of dimension T. For a particular sketch—say, $S'(t[i, \ldots, i+T-1])$—of subvector $t[i, \ldots, i+T-1]$, the j-th element of the sketch, where $1 \leq j \leq T$, may be synthesized as follows:

$$S'(t[i, \ldots, i+T-1])[j] = S^1(t[i, \ldots, i+X-1])[j] + S^2(t[i+T-X, \ldots, i+T-1])[j]). \quad (1)$$

The dimension k of a sketch may be chosen such that $$k = \frac{9 \log L}{\varepsilon^2}, \quad (2)$$

where L is the number of subvectors of dimension T and $\varepsilon$ is a user-defined error. By choosing k, the user also sets $\varepsilon$, thereby determining how much error to allow in the final result.

According to the distance property, for any given set L of subvectors of dimension T, for fixed $\varepsilon < \frac{1}{2}$ and k, then for any pair of subvectors $\vec{t}_i, \vec{t}_j \in L$ $$(1-\varepsilon) \| \vec{t}_i - \vec{t}_j \|^2 \leq \| \vec{S}(t_i) - \vec{S}(t_j) \|^2 \leq (1+\varepsilon) \| \vec{t}_i - \vec{t}_j \|^2. \quad (3)$$

Here $\| \vec{t}_i - \vec{t}_j \|^2$ is the $L_2$ distance between the two subvectors.

The distance property holds for synthesized sketches as well. In this case, $$(1-\varepsilon) \| \vec{t}_i - \vec{t}_j \|^2 \leq \| \vec{S}(t_i) - \vec{S}(t_j) \|^2 \leq 2(1+\varepsilon) \| \vec{t}_i - \vec{t}_j \|^2. \quad (4)$$

So, to compare sketches, the distance between sketches of the subvectors $\vec{S}(t_i), \vec{S}(t_j)$ may be calculated as $D(\vec{S}(t_i), \vec{S}(t_j))$, e.g., using the $L_2$ distance. The inter-sketch distance may be calculated as the sum of the distances, $$C^i(S(t(T))) = \Sigma_j D(\vec{S}(t_i), \vec{S}(t_j)). \quad (5)$$

The mechanisms and methods of the present invention may be implemented using a general-purpose microprocessor programmed according to the teachings of the present invention. The present invention thus also includes a machine-readable medium which includes instructions which may be executed by a processor to perform a method according to the present invention. This medium may include, but is not limited to, any type of disk including floppy disk, optical disk, CD-ROMs, or any type of media suitable for storing electronic instructions.

Figure 8:
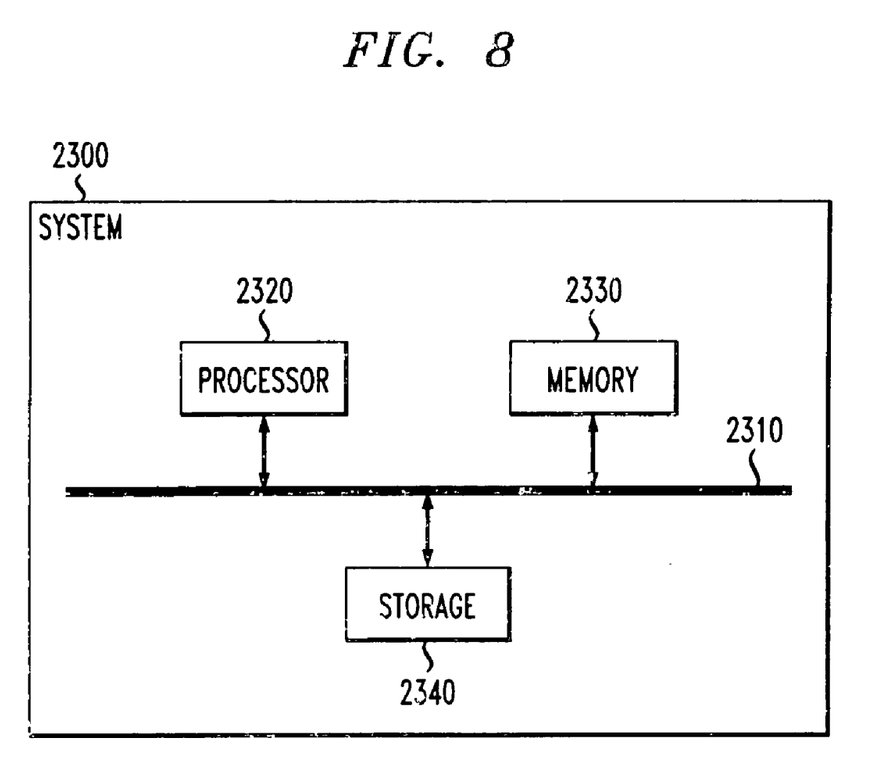
FIG. 8 is a block diagram of an embodiment of a computer system that can implement the present invention.

FIG. 8 is a block diagram of one embodiment of a computer system that can implement the present invention. The system 2300 may include, but is not limited to, a bus 2310 in communication with a processor 2320, a system memory module 2330, and a storage device 2340 according to embodiments of the present invention.

It is to be understood that the structure of the software used to implement the invention may take any desired form, such as a single or multiple programs.

Numerous modifications and variations of the present invention are possible in light of the above teachings. It is therefore to be understood that within the scope of the appended claims, the invention may be practiced otherwise than as specifically described herein.

What is claimed is:

1. A computer-implemented pattern-matching method comprising, from a data set:
   generating vectors from a plurality of partitions of the data set;
   reducing each generated vector to a lower dimensional vector;
   for each lower dimensional vector, summing distances between the lower dimensional vector and remaining lower dimensional vectors; and
   selecting the generated vector corresponding to the lower dimensional vector having a lowest summed distance as representative of the data set.

2. The method of claim 1, further comprising:
   outputting the generated vector as the representative of the data set.

3. The method of claim 2, the outputting comprising:
   outputting the generated vector to a graphical display.

4. The method of claim 2, the outputting comprising:
   outputting the generated vector to a storage device.

5. The method of claim 2, the outputting comprising:
   outputting the generated vector to a transmitter.

6. The method of claim 1, wherein the reducing comprises:
   choosing a dimension of the lower dimensional vectors;
   generating a plurality of random normalized vectors, the number of the random normalized vectors equaling the dimension of the lower dimensional vectors; and
   calculating a dot product between each of the generated vectors and each of the random normalized vectors to produce the lower dimensional vectors.

7. The method of claim 1, wherein the reducing comprises:
   choosing a dimension of the lower dimensional vectors;
   generating a plurality of random normalized vectors, the number of the random normalized vectors equaling the dimension of the lower dimensional vectors; and
   calculating a polynomial convolution between each of the generated vectors and each of the random normalized vectors to produce the lower dimensional vectors.

8. The method of claim 7, further comprising:
   generating another plurality of random normalized vectors, the number of the another random normalized vectors equaling the dimension of the lower dimensional vectors; and
   calculating a polynomial convolution between each of the generated vectors and each of the another random normalized vectors to produce second lower dimensional vectors.

9. The method of claim 8, further comprising:
   adding each lower dimensional vector with the corresponding second lower dimensional vector to produce third lower dimensional vectors, the third lower dimensional vectors representing fourth vectors with higher dimensionality than the generated vectors.

10. The method of claim 1, wherein the selecting comprises:
    identifying a dimension of the selected generated vector as a relaxed period.

11. The method of claim 1, wherein the selecting comprises:
identifying the selected generated vector as an average trend.

12. A computer-implemented pattern-matching method comprising, for a data set:
generating vectors from a plurality of partitions of the data set;
reducing each generated vector to a first lower dimensional vector and a second lower dimensional vector;
adding each first lower dimensional vector and the corresponding second lower dimensional vector to produce third lower dimensional vectors, wherein the third lower dimensional vectors represent fourth vectors with higher dimensionality than the generated vectors;
for each third lower dimensional vector, summing distances between the third lower dimensional vector and remaining third lower dimensional vectors; and
selecting one of the fourth vectors corresponding to the third lower dimensional vector having a lowest summed distance as representative of the data set.

13. The method of claim 12, further comprising:
outputting the one of the fourth vectors as the representative of the data set.

14. The method of claim 12, further comprising:
choosing a dimension of the first and second lower dimensional vectors;
generating a plurality of random normalized vectors, the number of the random normalized vectors equaling the dimension of the first and second lower dimensional vectors;
calculating a polynomial convolution between each of the generated vectors and each of the random normalized vectors to produce the first lower dimensional vectors;
generating another plurality of random normalized vectors, the number of the another random normalized vectors equaling the dimension of the first and second lower dimensional vectors; and
calculating a polynomial convolution between each of the generated vectors and each of the another random normalized vectors to produce the second lower dimensional vectors.

15. A computer-implemented pattern-matching method comprising, from a data set:
generating vectors from a plurality of partitions of the data set;
reducing each generated vector to a first lower dimensional vector, for each first lower dimensional vector, summing distances between the first lower dimensional vector and remaining first lower dimensional vectors;
if a lowest summed distance exceeds a predetermined threshold:
adding each first lower dimensional vector to a corresponding second lower dimensional vector to produce third lower dimensional vectors, wherein the third lower dimensional vectors represent fourth vectors with higher dimensionality than the generated vectors, and
for each third lower dimensional vector, summing distances between the third lower dimensional vector and remaining third lower dimensional vectors, and
selecting the generated vector corresponding to the first lower dimensional vector having the lowest summed distance or one of the fourth vectors corresponding to the third lower dimensional vector having the lowest summed distance as representative of the data set.

16. The method of claim 15, further comprising:
outputting the generated vector or the one of the fourth vectors as the representative of the data set.

17. The method of claim 15, wherein the reducing comprises:
choosing a dimension of the first lower dimensional vectors;
generating a plurality of random normalized vectors, the number of the random normalized vectors equaling the dimension of the first lower dimensional vectors; and
calculating a polynomial convolution between each of the generated vectors and each of the random normalized vectors to produce the first lower dimensional vectors.

18. The method of claim 17, wherein the adding comprises:
generating another plurality of random normalized vectors, the number of the another random normalized vectors equaling the dimension of the first lower dimensional vectors; and
calculating a polynomial convolution between each of the generated vectors and each of the another random normalized vectors to produce the second lower dimensional vectors.

19. The method of claim 15, wherein the selecting comprises:
identifying a dimension of the selected generated vector or a dimension of the selected one of the fourth vectors as a relaxed period.

20. The method of claim 15, wherein the selecting comprises:
identifying the selected generated vector or the selected one of the fourth vectors as an average trend.

21. A computer-implemented method of identifying a representative trend in data, comprising:
a) partitioning the data into a plurality of vectors having a predetermined dimension,
b) reducing the plurality of vectors to a corresponding plurality of lower dimensional vectors,
c) for each one of the lower dimensional vectors, summing distances between the one lower dimensional vector and remaining lower dimensional vectors,
d) selecting one of the plurality of vectors corresponding to the lower dimensional vector having a lowest summed distance,
e) if the lowest summed distance exceeds a predetermined threshold, adding each of the lower dimensional vectors with a corresponding one of another plurality of lower dimensional vectors to produce a third plurality of lower dimensional vectors, wherein the third plurality corresponds to another plurality of vectors having higher dimensionality than the plurality of vectors, and repeating c) and d) for the another plurality of vectors and the corresponding third plurality of lower dimensional vectors, and
f) identifying the predetermined dimension of the selected one of the plurality of vectors as a period of the data and the selected one of the plurality of vectors as the representative trend of the data.

22. The method of claim 21, further comprising:
outputting the period and the representative trend of the data.

23. A computer system, comprising:
means for partitioning a data set into a plurality of vectors;
means for reducing the plurality of vectors to a corresponding plurality of lower dimensional vectors;

for each one of the lower dimensional vectors, means for summing distances between the one lower dimensional vector and remaining lower dimensional vectors; and means for selecting one of the plurality of vectors corresponding to the lower dimensional vector having a lowest summed distance as representative of the data set.

24. The system of claim 23, further comprising:

means for outputting the one of the plurality of vectors as the representative of the data set.

25. A system, comprising:

a memory device having embodied therein data; and a processor in communication with the memory device, the processor configured to partition the data into a plurality of vectors, reduce the plurality of vectors to a corresponding plurality of lower dimensional vectors, for each one of the lower dimensional vectors, sum distances between the one lower dimensional vector and remaining lower dimensional vectors, and select one of the plurality of vectors corresponding to the lower dimensional vector having a lowest summed distance as representative of the data.

26. The system of claim 25, the processor further configured to:

output the one of the plurality of vectors as the representative of the data set.

27. A computer system, comprising:

means for generating vectors from a plurality of partitions of a data set;

means for reducing each generated vector to a first lower dimensional vector and a second lower dimensional vector;

means for adding each first lower dimensional vector and the corresponding second lower dimensional vector to produce third lower dimensional vectors, wherein the third lower dimensional vectors represent fourth vectors with higher dimensionality than the generated vectors, for each third lower dimensional vector, means for summing distances between the third lower dimensional vector and remaining third lower dimensional vectors, and means for selecting one of the fourth vectors corresponding to the third lower dimensional vector having a lowest summed distance as representative of the data set.

28. The system of claim 27, further comprising:

means for outputting the one of the fourth vectors as the representative of the data set.

29. A system, comprising:

a memory device having embodied therein data; and a processor in communication with the memory device, the processor configured to generate vectors from a plurality of partitions of the data, reduce each generated vector to a first lower dimensional vector and a second lower dimensional vector, add each first lower dimensional vector and the corresponding second lower dimensional vector to produce third lower dimensional vectors, wherein the third lower dimensional vectors represent fourth vectors with higher dimensionality than the generated vectors, for each third lower dimensional vector, sum distances between the third lower dimensional vector and remaining third lower dimensional vectors, and select one of the fourth vectors corresponding to the third lower dimensional vector having a lowest summed distance as representative of the data.

30. The system of claim 29, the processor further configured to:

output the one of the fourth vectors as the representative of the data.

31. A machine-readable medium containing program instructions for execution on a processor, which when executed by the processor, cause the processor to:

generate vectors from a plurality of partitions of a data set, reduce each generated vector to a lower dimensional vector, for each lower dimensional vector, sum distances between the lower dimensional vector and remaining lower dimensional vectors, and select the generated vector corresponding to the lower dimensional vector having a lowest summed distance as representative of the data set.

32. The machine-readable medium of claim 31, wherein the instructions further cause the processor to:

output the generated vector as the representative of the data set.

33. The machine-readable medium of claim 31, wherein the instructions further cause the processor to:

choose a dimension of the lower dimensional vectors;

generate a plurality of random normalized vectors, the number of the random normalized vectors equaling the dimension of the lower dimensional vectors; and calculate a dot product between each of the generated vectors and each of the random normalized vectors to produce the lower dimensional vectors.

34. The machine-readable medium of claim 31, wherein the instructions further cause the processor to:

choose a dimension of the lower dimensional vectors;

generate a plurality of random normalized vectors, the number of the random normalized vectors equaling the dimension of the lower dimensional vectors; and calculate a polynomial convolution between each of the generated vectors and each of the random normalized vectors to produce the lower dimensional vectors.

35. The machine-readable medium of claim 34, wherein the instructions further cause the processor to:

generate another plurality of random normalized vectors, the number of the another random normalized vectors equaling the dimension of the lower dimensional vectors; and calculate a polynomial convolution between each of the generated vectors and each of the another random normalized vectors to produce second lower dimensional vectors.

36. The machine-readable medium of claim 35, wherein the instructions further cause the processor to:

add each lower dimensional vector with the corresponding second lower dimensional vector to produce third lower dimensional vectors, the third lower dimensional vectors representing fourth vectors with higher dimensionality than the generated vectors.

37. The machine-readable medium of claim 31, wherein the instructions further cause the processor to:

identify a dimension of the selected generated vector as a relaxed period.

38. The machine-readable medium of claim 31, wherein the instructions further cause the processor to:

identify the selected generated vector as an average trend.

39. A machine-readable medium containing program instructions for execution on a processor, which when executed by the processor, cause the processor to:

generate vectors from a plurality of partitions of a data set, reduce each generated vector to a first lower dimensional vector and a second lower dimensional vector, add each first lower dimensional vector and the corresponding second lower dimensional vector to produce third lower dimensional vectors, wherein the third lower dimensional vectors represent fourth vectors with higher dimensionality than the generated vectors, for each third lower dimensional vector, sum distances between the third lower dimensional vector and remaining third lower dimensional vectors, and select one of the fourth vectors corresponding to the third lower dimensional vector having a lowest summed distance as representative of the data set.

40. The machine-readable medium of claim 39, wherein the instructions further cause the processor to:

output the one of the fourth vectors as the representative of the data set.

\* \* \* \* \*